United States Patent
Farah et al.

(10) Patent No.: US 7,581,385 B2
(45) Date of Patent: Sep. 1, 2009

(54) METERING SHEET AND ISO-GRID ARRANGEMENT FOR A NON AXI-SYMMETRIC SHAPED COOLING LINER WITHIN A GAS TURBINE ENGINE EXHAUST DUCT

(75) Inventors: Jorge I. Farah, Glastonbury, CT (US); Michael J. Murphy, Vernon, CT (US); John R. Buey, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 611 days.

(21) Appl. No.: 11/265,862

(22) Filed: Nov. 3, 2005

(65) Prior Publication Data

US 2009/0139221 A1 Jun. 4, 2009

(51) Int. Cl.
*F02C 7/12* (2006.01)
*F02K 1/82* (2006.01)

(52) U.S. Cl. .............................. 60/266; 60/39.5; 428/72; 428/116

(58) Field of Classification Search .................. 60/39.5, 60/265, 266, 752, 754; 428/72, 73, 116, 428/118
See application file for complete search history.

(56) References Cited

U.S. PATENT DOCUMENTS

| 5,596,870 | A  | * | 1/1997 | Dillard et al. | 60/752 |
| 5,782,294 | A  | * | 7/1998 | Froemming et al. | 60/752 |
| 6,199,371 | B1 | * | 3/2001 | Brewer et al. | 60/766 |
| 7,146,815 | B2 | * | 12/2006 | Burd | 60/752 |

* cited by examiner

*Primary Examiner*—Louis J Casaregola
(74) *Attorney, Agent, or Firm*—Carlson, Gaskey & Olds PC

(57) ABSTRACT

A cooling liner having a liner hot sheet formed as a relatively thick iso-grid structure having iso-grid ribs, which extend from a surface between the ribs. A multitude of metering sheets are mounted directly to the liner hot sheet surface. Each metering sheet is mounted to the iso-grid to define a multitude of discrete chambers. A seal is located in a pattern along a subset of the iso-grid ribs to further segregate the surface covered by each metering sheet into a further number of discrete subchambers. Each metering sheet includes a multitude of metering sheet apertures and the surface between the iso-grid ribs of the liner hot sheet include a multitude of hot sheet apertures. By varying the ratio between the number of metering sheet apertures and the number of hot sheet apertures, the pressure in each chamber is defined to efficiently maintain the minimum desired pressure ratio across the hot sheet without undue wastage of cooling airflow.

18 Claims, 4 Drawing Sheets

METERING SHEET AND ISO-GRID ARRANGEMENT FOR A NON AXI-SYMMETRIC SHAPED COOLING LINER WITHIN A GAS TURBINE ENGINE EXHAUST DUCT

This invention was made with government support under Contract No.: MDA972-00-9-0006. The government therefore has certain rights in this invention.

BACKGROUND OF THE INVENTION

The present invention relates to gas turbine engines having a dual wall cooling liner, and more particularly to an exhaust duct cooling liner for a non-axi symmetric cooling liner.

In order to improve gas turbine engine operation and performance, the usage of exhaust duct cooling air is carefully rationed. The cooling air is generally extracted from the engine fan flow, this extracted cooling air is a penalty to the overall performance of the engine. In current gas turbine engine exhaust ducts, a liner is disposed between the engine's working medium (exhaust gas path) and the engine outer casing or vehicle exhaust duct. Cooling air typically extracted from the engine's compressor is flowed within the liner and duct then discharged over the nozzle located at the end of the exhaust duct. A relatively significant quantity of cooling air is required to properly cool the exhaust duct and to maintain a positive pressure within the cooling liner while being subjected to large core pressure gradients at various operating conditions.

Advanced gas turbine engine exhaust systems are tending toward non axi-symmetric shapes. These shapes advantageously facilitate low observability and vectoring capabilities but generate a non-uniform core pressure field on the cooling liner. As the liner is film cooled, the non-uniform core pressure distribution posses a relatively significant challenge in the maintenance of a minimum pressure ratio between the local maximum core pressure and the cooling airflow supply pressure so as to prevent the high temperature core gases from being ingested into the liner system. If the cooling supply pressure cannot be spatially adjusted to match the non-uniform core pressure field, a greater quantity of cooling air may be required to achieve the minimum cooling to core pressure ratio than would otherwise be necessary to cool the liner as the cooling airflow is typically baselined for the most adverse pressure gradient during the most adverse operating condition. The non axi-symmetric and non-linear shaped exhaust duct further complicates the consistent preservation of a positive pressure gradient.

Current cooling liners, although effective, are still somewhat lacking in the compartmentalization fidelity necessary to maintain a positive pressure gradient along the entire length of a non axi-symmetric and non-linear cooling liners. Such lack of fidelity results in a relatively inefficient usage of cooling air, which may at least partially, penalizes engine performance.

Accordingly, it is desirable to provide effective cooling of a non axi-symmetric exhaust duct which maintains a positive pressure along the cooling liner while subjected to a large core pressure gradient, yet efficiently utilizes the cooling airflow.

SUMMARY OF THE INVENTION

The exhaust system according to the present invention includes a cooling liner having a liner core flowpath (hot sheet), a metering sheet and an outer pressure vessel. The present invention takes advantage of the existing structural iso-grid ribs with addition of metering sheets to achieve efficient flow control via discrete chamberization of the liner system. The hot sheet is formed as a relatively thick iso-grid structure in which a pattern formed in the sheet varies in thickness to define a multitude of iso-grid ribs. A multitude of metering sheets are mounted directly to the hot sheet to divide the liner hot sheet surface into discrete surface sections. Each metering sheet is mounted to the iso-grid ribs to form a multitude of discrete chambers. Each discrete chamber formed is subjected to a smaller core spatial pressure gradient than the liner as a whole. A seal is located in a pattern along the iso-grid ribs to further segregate each metering sheet into a further number of discrete subchambers.

Each metering sheet includes a multitude of metering sheet apertures and the surface between the iso-grid ribs of the liner hot sheet includes a multitude of hot sheet apertures. The cooling airflow from the cooling liner volume passes through the metering sheet apertures and then the hot sheet apertures to cool the hot sheet through film cooling. By varying the ratio between the number of metering sheet apertures and the number of hot sheet apertures, the pressure in each subchamber is defined to efficiently maintain the minimum desired pressure ratio across the liner hot sheet in that section without undue wastage of cooling airflow. The discrete chambers permits each chamber's flow area to be tailored to its local core pressure field to maintain a positive pressure within the cooling liner when subjected to a large core pressure gradient. Discrete chamberization also provides for a more efficient usage of cooling air which increases engine efficiency.

In one attachment, the metering sheet is attached to the liner hot sheet iso-grid through stud fasteners, which extends from the liner hot sheet though a corresponding aperture in the metering sheet to bias the metering sheet onto the seal. A collar is then secured to each stud fastener to sandwich the metering sheet thereon. In another attachment, a spring bracket is mounted to a cooling liner stiffener to apply a preload to the metering sheet and bias the metering sheet onto the seal.

The present invention therefore provides effective cooling of a non axi-symmetric exhaust duct that maintains a positive pressure along the cooling liner while subjected to a large core pressure gradient, yet efficiently utilizes the cooling airflow.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
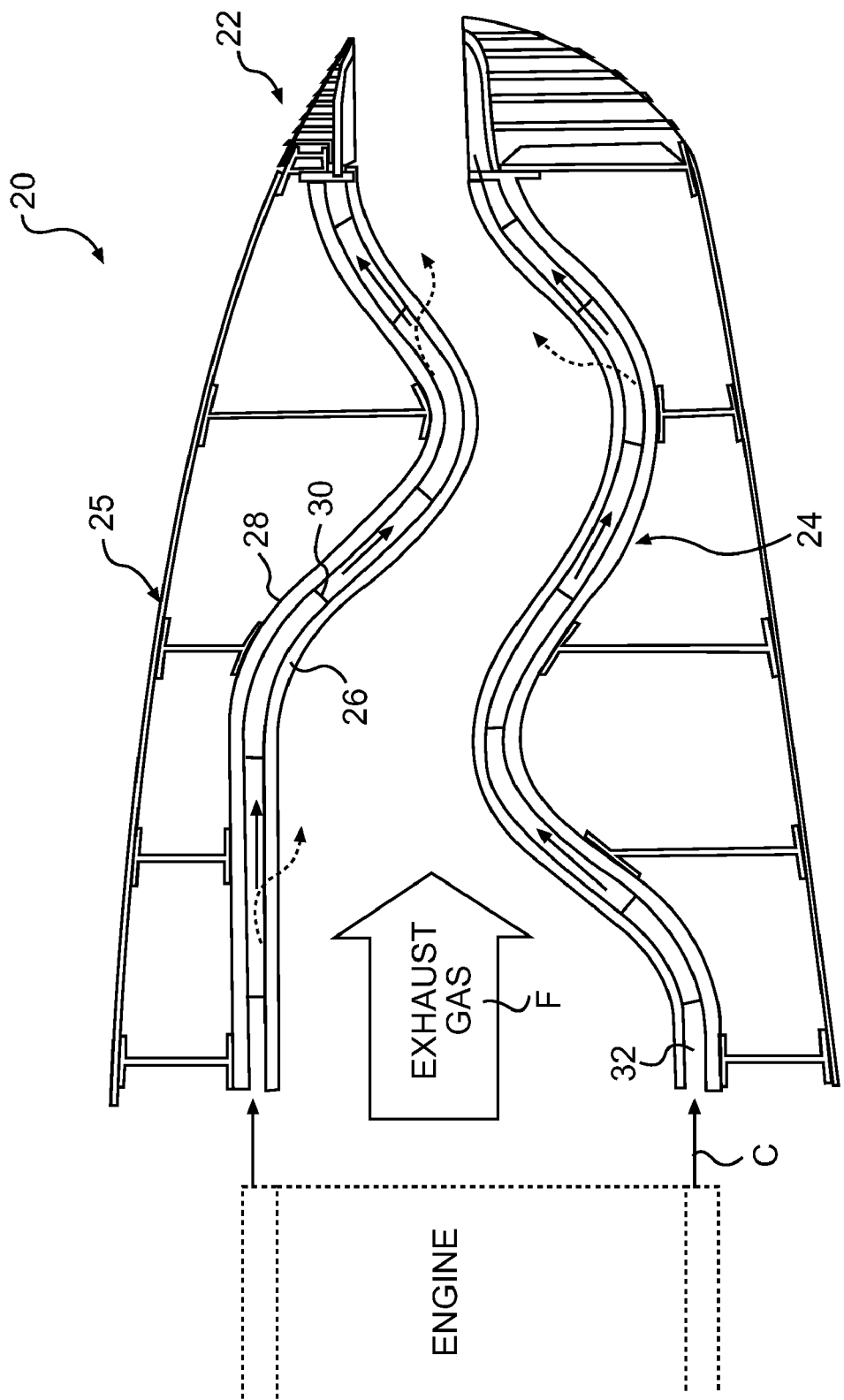
FIG. 1 is a cross sectional side elevation view of an exhaust system.

FIG. 1 illustrates a sectional view of an exhaust duct assembly 20 for a gas turbine engine (illustrated schematically at E).

The exhaust duct assembly 20 is of a non axi-symmetric and non-linear geometry. The exhaust duct assembly 20 includes an annular upstream portion (best seen in FIG. 1) which receives a core combustion gas flow F from the engine E, communicates the core combustion gas flow through a series of non-linear serpentines, then exhausts the core combustion gas flow through a generally rectilinear exhaust nozzle 22 (illustrated schematically).

A cooling liner 24 (also illustrated in FIG. 2) is mounted within a vehicle structure 25. It should be understood that various mounting arrangements as well as vehicles would benefit from the present invention. The cooling liner 24 preferably includes a liner hot sheet 26 separated from an outer pressure vessel 28 by a multitude of cooling liner stiffeners 30 (also illustrated in FIG. 3).

Cooling airflow C, such as from an engine compressor or ambient intakes flows through a cooling liner volume 32 defined between the liner hot sheet 26 and the outer pressure vessel 28. The cooling airflow C traversing the volume 32 cools the liner 24 through convection. The cooling airflow is typically sourced from fan bypass airflow and/or other airflow that is different from a core combustion gas airflow.

Figure 2:
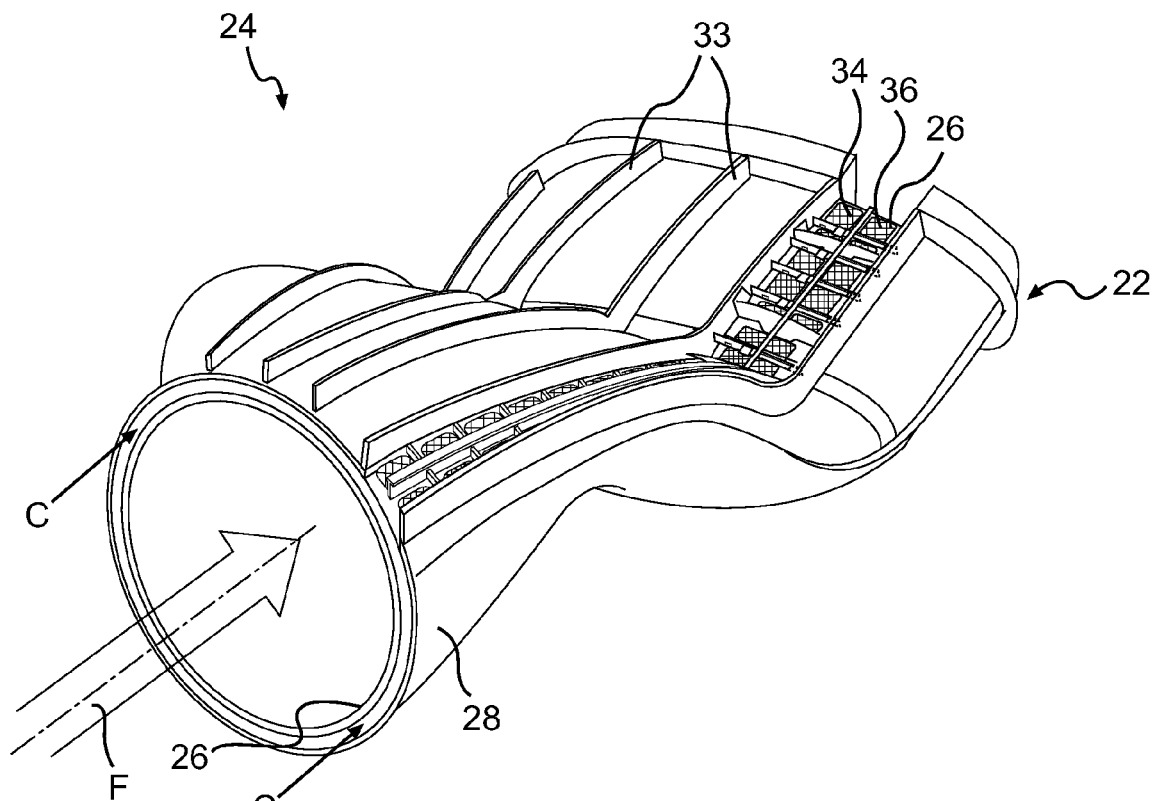
FIG. 2 is a perspective partial phantom view of a cooling liner of an exhaust system.

Referring to FIG. 2, the liner hot sheet 26 (core flowpath iso-grid) itself provides significant inherent structural support for the liner 24. The liner hot sheet 26 (core flowpath iso-grid) is formed as a relatively thick iso-grid structure in which a pattern formed in the sheet varies in thickness for structural stiffness (illustrated in FIG. 3A). A multitude of external stiffeners 33 attached to the liner cold sheet 28 maintain the geometry of the cooling liner 24 and facilitate attachment to the vehicle structure 25. It should of course be realized that any iso-grid type cooling liner will be usable with the present invention. It should also be understood that although a relatively rectilinear iso-grid geometry is illustrated in FIG. 3A, other geometries will also be usable with the present invention.

Figure 3A:
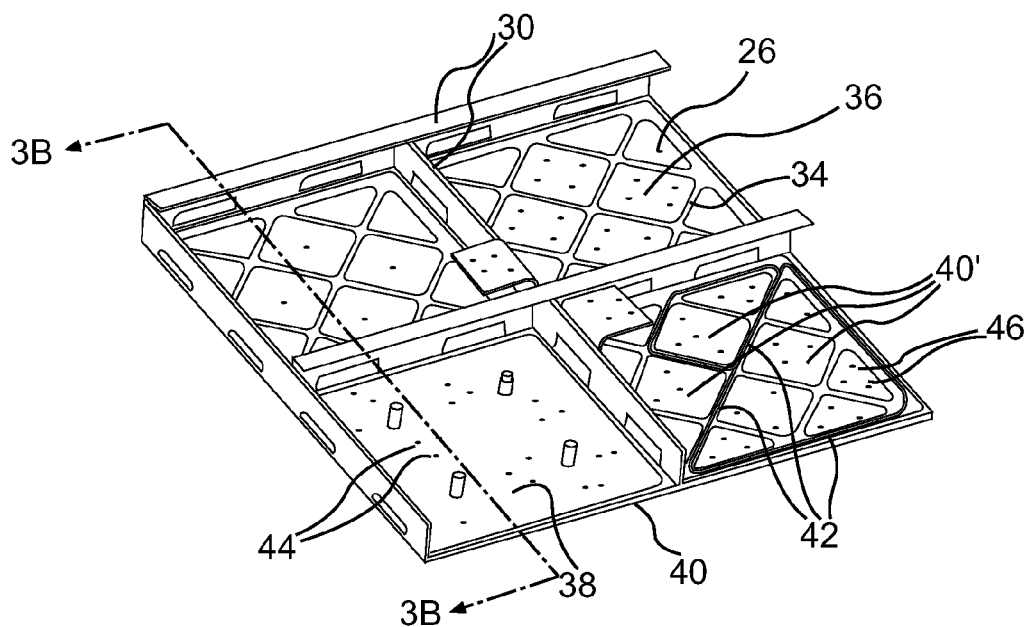
FIG. 3A is a perspective partial view of a liner hot sheet section with a liner cold sheet removed.

Referring to FIG. 3A, a multitude of metering sheets 38 (only one shown) are mounted directly to the liner hot sheet 26 preferably between the liner stiffeners 30. It should be understood that any number of metering sheets 38 may be mounted to the liner hot sheet 26 and need not be located along the entire liner hot sheet 26. Each metering sheet 38 divides the liner hot sheet 26 surface into a multitude of discrete surface sections. Each metering sheet 38 is mounted to the iso-grid ribs 34, forming a multitude of discrete chambers 40 generally between a set of liner stiffeners 30 (also illustrated in FIG. 3B). Each discrete chamber formed is subjected to a smaller core spatial pressure gradient than the liner as a whole. Preferably, a seal 42 is located in a pattern along the iso-grid ribs 34 to further segregate each metering sheet 38 into a further number of discrete subchambers 40'. That is, by locating one or more seals 42 in a particular path along particular subset of iso-grid ribs 34, each section of the liner hot sheet 26 which has been segregated by one metering sheet 38 is further segregated into a multitude of discrete subchambers 40'.

Figure 3B:
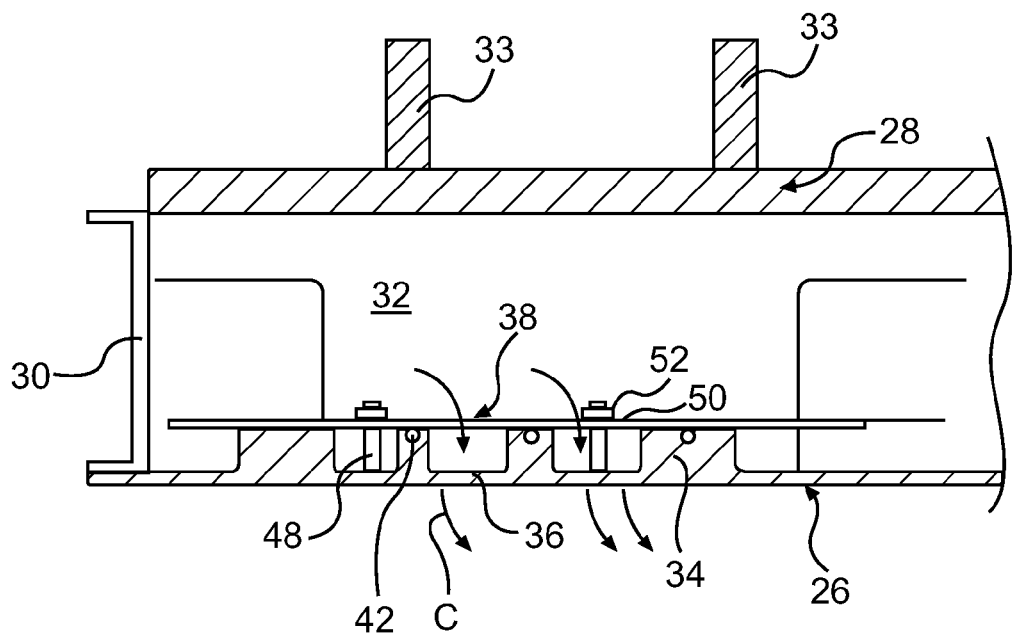
FIG. 3B is a sectional view taken along line 3B-3B in FIG. 3A.

Each metering sheet 38 includes a multitude of metering sheet apertures 44 and the surface 36 between the ribs 34 of the liner hot sheet 26 include a multitude of liner hot sheet apertures 46 (also illustrated in FIG. 3B). It should be understood that the term "apertures" may include openings of any size and shape as well as those which may include the entirety between the iso-grid ribs 34. The cooling airflow C from the cooling liner volume 32 passes through the metering sheet apertures 44 to provide impingement cooling of the hot sheet, and then the liner hot sheet apertures 46 cools the liner hot sheet 26 through film cooling.

By varying the cooling airflow communication ratio between the metering sheet apertures 44 and the liner hot sheet apertures 46, the pressure in each subchamber 40' as defined by the seal 42 may be predetermined to efficiently maintain the minimum desired pressure ratio across the liner hot sheet 26 without undue wastage of cooling airflow C. The discrete subchambers 40' permits each chamber's flow area to be tailored to its local core pressure field to maintain a positive pressure within the cooling liner while being subjected to a large core pressure gradients. Discrete chamberization also provides for a more efficient usage of cooling air, which increases engine efficiency.

Reducing the core spatial pressure gradient to maintain the minimum cooling to core pressure ratio within each of the discrete subchambers 40' reduces the total amount required cooling air while assuring effective cooling. Furthermore, the pattern of the metering sheet apertures 44 and the pattern of the multitude of liner hot sheet apertures 46 provides for impingement cooling of the liner hot sheet 26. In other words, the metering sheet apertures 44 and the multitude of liner hot sheet apertures 46 need not be directly aligned such that the cooling airflow through the metering sheet apertures 44 impinges on the liner hot sheet 26 prior to passage through the multitude of liner hot sheet apertures 46

Attachment of the metering sheet 38 to the liner hot sheet iso-grid is necessary to establish chamber perimeterization and may be achieved through various attachment arrangements. One attachment includes a stud fastener 48, which extends from the liner hot sheet 26 though a corresponding aperture 50 in the metering sheet 38. A collar 52 is then secured to the stud fastener 48 to sandwich the metering sheet 38 thereon.

Figure 4A:
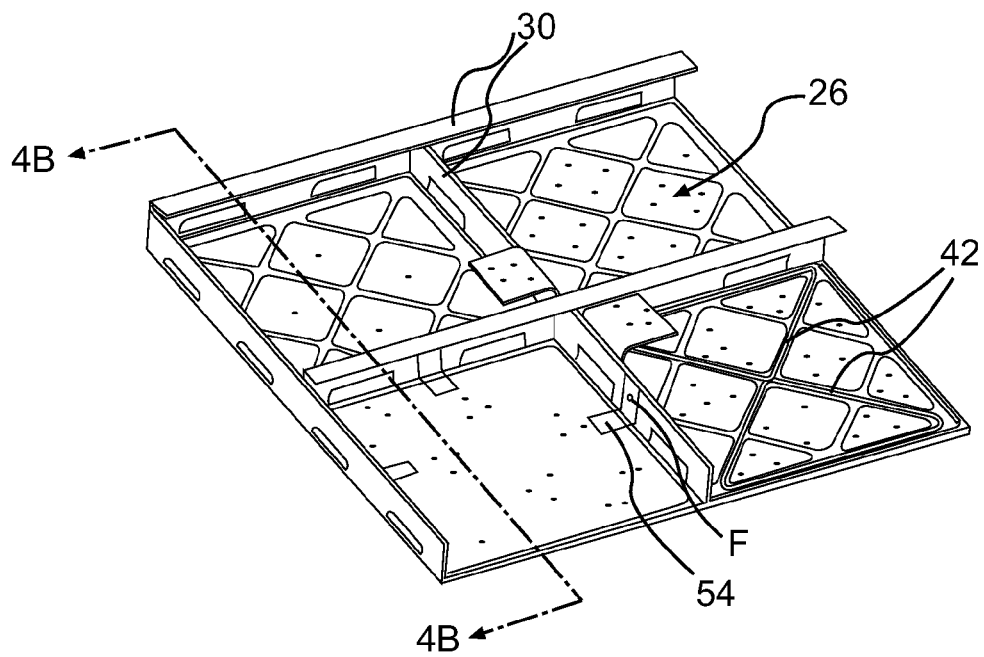
FIG. 4A is a perspective partial view of another liner hot sheet section with a liner cold sheet removed.
Figure 4C:
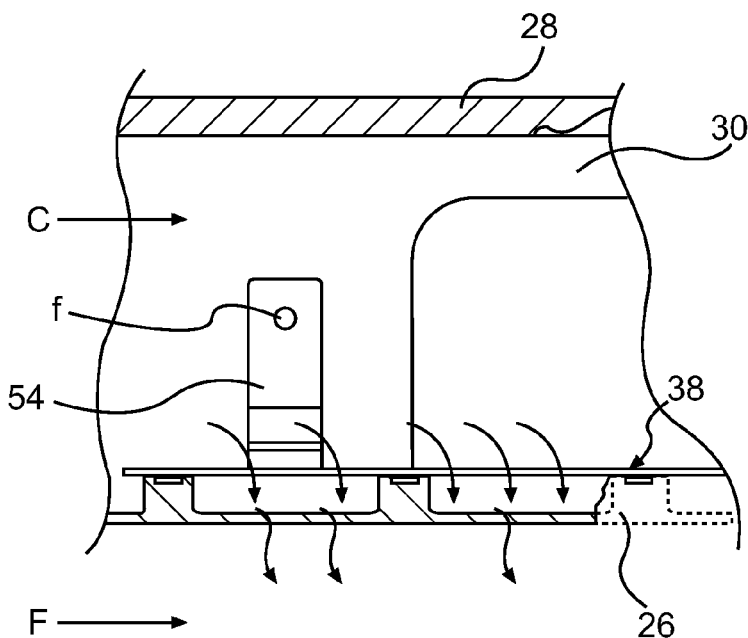
FIG. 4C is a sectional view taken along line 4C-4C in FIG. 4A.
Figure 4B:
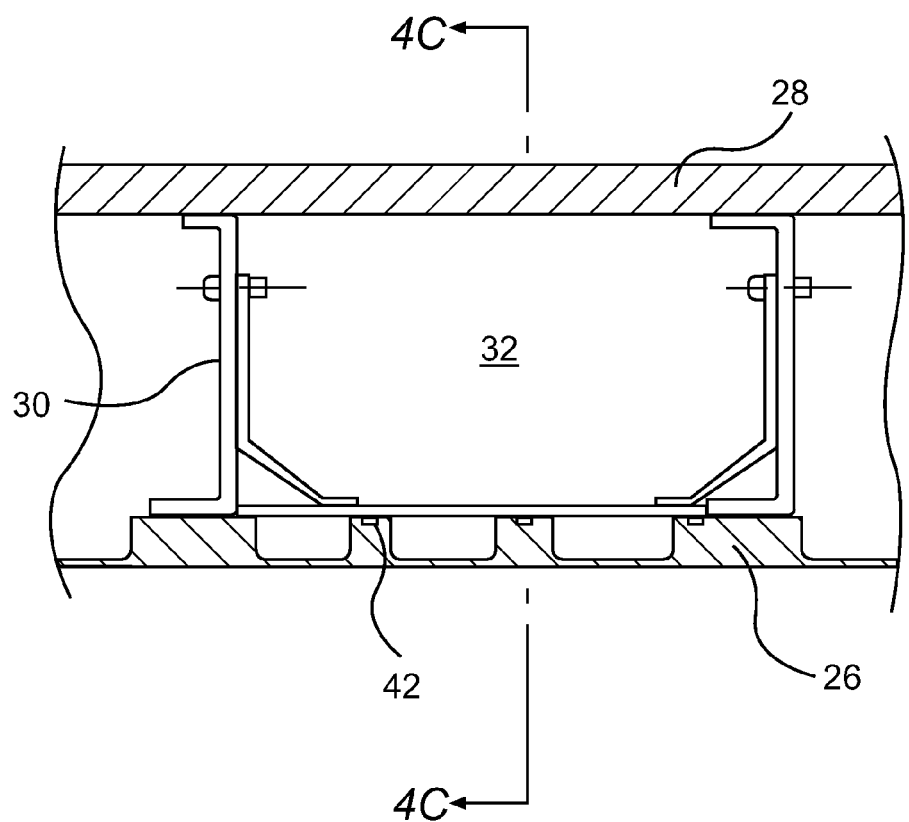
FIG. 4B is a sectional view taken along line 4B-4B in FIG. 4A.

Referring to FIG. 4A, another attachment arrangement includes a spring bracket 54 mounted to the cooling liner stiffener 30. The spring bracket 54 preferably applies a preload to the metering sheet 38 to bias the metering sheet 38 onto the seal 42. Each spring bracket 54 is attached to an associated liner stiffener 30 though a fastener F such as rivet or the like (FIGS. 4A and 4B). It should be understood that various attachments, which maintain the metering sheet 38 onto the liner hot sheet 26 may be utilized.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A cooling liner for an exhaust system of a gas turbine engine comprising:
   a liner metering sheet;
   a liner hot sheet defining an iso-grid having a multitude of ribs which extend from a liner hot sheet surface and at least one liner hot sheet aperture formed through said liner hot sheet surface;
   a multitude of stiffeners which extend from said liner hot sheet; and
   said metering sheet having at least one metering sheet aperture, said metering sheet mounted to said multitude of ribs between at least two of said multitude of stiffeners to define at least one chamber between said metering plate and said liner hot sheet such that said at least one liner hot sheet aperture is in fluid communication with said at least one metering sheet aperture.

2. The cooling liner as recited in claim 1, further comprising a seal mounted between said multitude of ribs and said metering sheet to define a perimeter of said at least one chamber.

3. The cooling liner as recited in claim 1, further comprising a multitude of seals mounted between said multitude of ribs and said metering sheet, each of said multitude of seals defines a perimeter of a subchamber which subdivides said metering sheet.

4. The cooling liner as recited in claim 1, further comprising a fastener which attaches said metering sheet to said liner hot sheet.

5. The cooling liner as recited in claim 4, wherein said fastener includes a fastener stud and collar which sandwiches said metering sheet therebetween.

6. The cooling liner as recited in claim 4, wherein said fastener includes a spring bracket attached to a stiffener, said stiffener attached to said metering sheet and said liner hot sheet.

7. The cooling liner as recited in claim 1, wherein said multitude of ribs and said liner hot sheet surface are of a thickness which maintains structural integrity.

8. A cooling liner for an exhaust system of a gas turbine engine comprising:
   a liner metering sheet;
   a liner hot sheet defining an iso-grid having a multitude of ribs which extend from a liner hot sheet surface and at least one hot sheet aperture formed through said liner hot sheet surface;
   a stiffener mounted between a liner outer pressure vessel and said liner hot sheet;
   at least one seal which defines a seal path along a predetermined subset of said multitude of ribs; and
   said metering sheet having at least one metering sheet aperture, said metering sheet mounted to said at least one seal to define at least one chamber between said metering sheet and said liner hot sheet such that said at least one liner hot sheet aperture is in fluid communication with said at least one metering sheet aperture.

9. The cooling liner as recited in claim 8, wherein said liner hot sheet is a self-supporting structural member.

10. The cooling liner as recited in claim 9, wherein said liner hot sheet is a non-supportive member.

11. The cooling liner as recited in claim 8, further comprising a liner stiffener mounted to said liner outer pressure vessel opposite said liner hot sheet.

12. The cooling liner as recited in claim 10, wherein said liner stiffener is mountable to a vehicle structure.

13. The cooling liner as recited in claim 8, wherein said liner hot sheet and said liner outer pressure vessel are non axi-symmetric.

14. The cooling liner as recited in claim 8, wherein said liner hot sheet and said liner outer pressure vessel are axi-symmetric.

15. The cooling liner as recited in claim 1, wherein said multitude of stiffeners which extend from said liner hot sheet include at least four stiffeners which bound said metering sheet.

16. The cooling liner as recited in claim 15, further comprising a liner outer pressure vessel supported by said multitude of stiffeners.

17. The cooling liner as recited in claim 1, wherein said multitude of stiffeners extend from said liner hot sheet for a distance greater than said iso-grid.

18. The cooling liner as recited in claim 17, further comprising a liner outer pressure vessel supported by said multitude of stiffeners.

* * * * *

UNITED STATES PATENT AND TRADEMARK OFFICE
CERTIFICATE OF CORRECTION

| | | |
|---|---|---|
| PATENT NO. | : 7,581,385 B2 | Page 1 of 1 |
| APPLICATION NO. | : 11/265862 | |
| DATED | : September 1, 2009 | |
| INVENTOR(S) | : Farah et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Fourteenth Day of September, 2010

David J. Kappos
*Director of the United States Patent and Trademark Office*